United States Patent [19]

Kohlstadt

[11] Patent Number: 4,824,512

[45] Date of Patent: Apr. 25, 1989

[54] LOW VISCOSITY, PREGELABLE RUBBER-BASED ADHESIVES

[75] Inventor: Hans-Peter Kohlstadt, Velbert, Fed. Rep. of Germany

[73] Assignee: Henkel Kommanditgesellschaft auf Aktien, Duesseldorf, Fed. Rep. of Germany

[21] Appl. No.: 77,258

[22] Filed: Jul. 24, 1987

[30] Foreign Application Priority Data

Jul. 24, 1986 [DE] Fed. Rep. of Germany ....... 3625030

[51] Int. Cl.$^4$ .......................... C09J 3/12; C08C 19/08; B62D 27/00

[52] U.S. Cl. .................... 156/334; 521/44.5; 521/45; 521/45.5; 521/46; 524/432; 524/433; 524/456; 524/508; 524/783; 524/787; 524/788; 524/856; 524/534

[58] Field of Search .............. 521/44.5, 45.5, 46, 521/45; 524/508, 856, 432.3, 456, 534, 787–788, 783

[56] References Cited

U.S. PATENT DOCUMENTS

| | | | |
|---|---|---|---|
| 3,949,125 | 4/1976 | Roberts | 428/483 |
| 3,957,737 | 5/1976 | Pautrat et al. | 525/376 |
| 3,981,342 | 9/1976 | Farber et al. | 152/347 |
| 4,064,922 | 12/1977 | Farber et al. | 152/347 |
| 4,181,635 | 1/1980 | Takamatsu et al. | 524/271 |
| 4,426,419 | 1/1984 | Uffner et al. | 525/54.5 |
| 4,440,816 | 4/1984 | Uffner | 525/54.5 |
| 4,471,094 | 9/1984 | Uffner et al. | 524/474 |
| 4,478,912 | 10/1984 | Uffner et al. | 524/62 |
| 4,481,335 | 11/1984 | Stark | 525/290 |
| 4,564,670 | 1/1986 | Kearnan | 528/389 |
| 4,600,745 | 7/1986 | Creighton | 524/856 |

FOREIGN PATENT DOCUMENTS

| 97394 | 6/1983 | European Pat. Off. . |
|---|---|---|
| 2303678 | 3/1976 | France . |

*Primary Examiner*—Herbert J. Lilling
*Attorney, Agent, or Firm*—Ernest G. Szoke; Wayne C. Jaeschke; Henry E. Millson, Jr.

[57] ABSTRACT

Rubber based adhesives containing liquid stereospecific polybutadiene rubber, one or more hardeners or hardener systems, fillers and optionally primers, which contain one or more chemically irreversibly depolymerized solid rubbers of natural or synthetic origin in quantities of from 1.5 to 5% by weight, based on the sum of the constituents, to a process for the production of these low-viscosity rubber-based adhesives by chemically irreversible depolymerization of one or more solid rubbers of natural or synthetic origin, and to the use of these low-viscosity rubber-based adhesives in the bonding of metal components in automotive manufacturing.

25 Claims, No Drawings

LOW VISCOSITY, PREGELABLE RUBBER-BASED ADHESIVES

BACKGROUND OF THE INVENTION

1. Field of the Invention

This invention relates to low-viscosity, pregelable rubber-based adhesives having improved performance properties, to a process for producing these new adhesives, and to their use.

2. Statement of Related Art

The use of epoxy resin or plastisol adhesives in car manufacture has long been known. Important requirements which adhesives such as these have to satisfy include firm adhesion of the adhesive material to steel surfaces and to galvanized surfaces and pregelability of the adhesive at temperatures higher than 120° C.

Good results are also obtained with solvent-free rubber-based adhesives. Rubber-based adhesives such as these have to satisfy stringent demands in regard to the strength of the bond and low-temperature flexibility. In addition, materials of this type have to show low viscosity and favorable rheological properties, for example short break-off and high stability, in order to lead to stable, long-lasting bonds in car manufacturing. To achieve this, it is necessary to use solid rubbers in addition to the basic liquid rubber materials. The solid rubber used in European application No. 0 097 394, for example, is stereospecific 1,4-butadiene rubber in which at least 40% of the unsaturated side chains are in the 1,4-configuration. Unfortunately, the use of solid rubbers of this type is likewise attended by serious disadvantages in terms of practical application. Although the requisite bond strengths and high low-temperature flexibility can be obtained, the adhesives are difficult to apply because of their high viscosity. However, if the viscosity of the adhesives is adjusted to a value suitable for practical application, the result is unsatisfactory strength of the bonds and unsatisfactory rheological properties of the adhesives. The adhesive becomes stringy and runs off from the joints which is also undesirable. In addition, pregelability at comparatively low application temperatures could not be achieved with the rubber-based adhesives disclosed in EP-A 0 097 394 using solid rubbers, such as solid polybutadiene.

In addition, conventional vulcanization systems (hardener systems) could not be used at all with the solid/liquid rubber mixtures disclosed in the prior art. Also, the use of vulcanization accelerators, such as dibenzothiazyl disulfide or diphenyl guanidine, led to the disadvantage that pregelability was only possible at temperatures above 160° C. and to the further disadvantage that, at pregelling temperatures of above 160° C. and hardening temperatures above 200° C., bubbles were formed in the hardened adhesive to the considerable detriment of adhesion.

STATEMENT OF THE INVENTION

Other than in the operating examples, or where otherwise indicated, all numbers expressing quantities of ingredients or reaction conditions used herein are to be understood as modified in all instances by the term "about".

An object of the present invention is to provide new rubber-based adhesive materials which combine the advantages of conventional adhesives, such as epoxy resin or plastisol adhesives, (higher elasticity, absence of halogen), with the known positive properties of plastisol adhesives, such as for example pregelability at relatively low temperatures and good adhesion to steel surfaces and galvanized surfaces. In addition, the invention seeks to provide high bond strengths and to improve the application properties of hitherto known adhesives by combining relatively low viscosity with good rheological properties (short break-off, high stability). In addition, the new rubber-based adhesives show high stability in storage and better compatibility with conventional vulcanization accelerators.

It has now surprisingly been found that low-viscosity adhesives which show satisfactory rheological behavior for application and which are capable of producing high bond strengths can be obtained by using chemically irreversibly depolymerized solid rubbers instead of solid, stereospecific 1,4-butadiene rubbers.

The present invention relates to rubber-based adhesives containing
(a) from 20 to 60% by weight of a liquid stereospecific polybutadiene diene rubber; (b) from 1.5 to 5% by weight of one or more chemically irreversibly depolymerized solid rubbers of natural or synthetic origin;
(c) from 0.5 to 15% by weight of one or more hardeners or hardener systems;
(d) from 25 to 70% by weight of one or more fillers;
(e) from 0 to 8% by weight, preferably from 1 to 8% by weight, of one or more primers;
(f) from 0 to 12% by weight, preferably from 2 to 12% by weight, of sulfur.

The present invention also relates to a process for the production of the above rubber-based adhesives comprising the steps of
A. chemically irreversibly depolymerizing one or more solid rubbers of natural or synthetic origin to a viscosity of from 2000 P to 20,000 P at 20° C.,
B. optionally dissolving the resulting depolymerization products in liquid rubber (component (a)) and
(c) mixing the depolymerized rubber (or solution thereof from step B) with components (a) (if not used in step B) and (c) to (f) to form a homogeneous rubber mixture.

The present invention also relates to the use of the rubber-based adhesives in the bonding of metal parts in automotive manufacturing, i.e. for filling gaps and sealing joints in motor vehicles.

Suitable liquid rubbers (component (a)) are any of the liquid stereospecific polybutadiene rubbers commonly used in the adhesives field. Those types which have a molecular weight of from 1000 to 8000 are preferable. Within such types, stereospecific polybutadienes of which from 40 to 95% has the 1,4-configuration are used with advantage. Within that group, stereospecific polybutadienes of which more than 80% is in the 1,4-configuration are preferably used in the rubber-based adhesives of the invention.

Suitable hardeners or hardener systems (component (c)) for hardening the liquid rubber/solid rubber mixtures are agents known for this purpose which, through appropriate combination and concentration, produce the required strengths at hardening temperatures of from 120° C. to 240° C. The hardener systems (both hardeners and hardener systems are included herein under the term "hardeners") can be conventional one-stage hardeners, such as dibenzothiazyl disulfide, for example, or two-stage hardeners which enable the adhesives to be pregelled at a temperature higher than 120° C. Two-stage hardeners of the type which contain N-cyclohexyl-2-benzothiazyl sulfenamide and 2-mercaptobenzothiazole for the first stage and diorthotolyl guanidine for the second stage are used with advantage as vulcanization systems.

In addition, the rubber-based adhesives according to the invention contain one or more fillers (component (d)) for adjusting rheological behavior in quantities of from 25 to 70% by weight, based on the total weight of the adhesives. This addition is also made inter alia to adjust rheological behavior. Suitable fillers are any of the substances known for this purpose from the prior art, which can be used either individually or in combination with one another. Preferred fillers are zinc oxide, calcium oxide, silica, magnesium-aluminum silicates, or carbon black in different quantitative ratios. For example, zinc oxide can be used in a mixture of the above fillers in quantities of from 1 to 5% by weight, calcium oxide in quantities of from 3 to 8% by weight, slica in quantities of from 1 to 5% by weight, magnesium-aluminum silicate in quantities of from 20 to 50% by weight, and carbon black in quantities of from 0.5 to 2% by weight, these percentages by weight being based on the total weight of the adhesive. However, the above individual filler components can also be used in quantities above or below the ranges indicated.

The rubber-based adhesives normally also contain one or more primers (component (e)) in quantities of from 1 to 8% by weight, based on the total weight of all the components of the adhesive mixtures. These primers are used to improve the adhesion of the formulated adhesive to steel surfaces and, in particular, to galvanized steel surfaces. Suitable primers are, for example, such materials as phenol-cresol resins, preferably those containing up to 4-7% of free phenol.

Component (b) is one or more solid stereospecific cis-1,4-butadiene rubber and/or solid natural rubber which are chemically irreversibly depolymerized. The favorable effect which this component (b) has on viscosity, elasticity, rheological behavior and adhesiveness derives from the fact that it is chemically irreversibly depolymerized from synthetic rubbers or natural rubbers to a viscosity of from 2000 P to 20,000 P at 20° C. The depolymerization is preferably effected by depolymerization of the crude high-polymer products on friction rolls. Degradation to the required molecular weight range is directly achieved in this way.

Alternatively, depolymerization can also be effected with the same advantageous result by depolymerizing the solid rubbers of natural or synthetic origin in an internal float-weight kneader. This can be done in either the presence or in the absence of a depolymerization accelerator, and preferably in the presence of such an accelerator. Suitable depolymerization accelerators are any of the compounds known for this purpose. One example of a suitable depolymerization accelerator is the zinc salt of pentachlorothiophenol.

The depolymerization is carried out at temperatures of from 120° C. of 150° C. and gives products having the desired molecular weight, or rather the desired viscosity.

The depolymerization products obtained are then dissolved in liquid rubber (component a) to make them easier to incorporate in adhesives. Preferred are liquid rubbers having a molecular weight of from 1000 to 8000 which are chemically very similar to the solid rubbers depolymerized in accordance with the invention. Liquid rubbers having a molecular weight of from 1000 to 3000 are used with advantage as "solvents."

However, the step of first dissolving the depolymerization products obtained in liquid rubber may also be avoided, for example, by using natural rubbers of which the depolymerization leads directly to depolymerized natural rubbers of the desired consistency. For example, it is possible to use the liquid natural rubber marketed under the name of DPR 75 by Hardman (USA), which has been depolymerization to a product of viscous consistency which may be used for adhesives according to the invention without prior dissolution in liquid rubber.

Rubber mixtures for adhesives normally also contain elemental sulfur in the form of ground sulfur for vulcanization. Sulfur may be used in quantities of from 2 to 12% by weight for adhesive according to the invention.

The solutions obtained are mixed with the other components (liquid rubber (a) (if not premixed with component (b)), hardener or hardener system (c), filler (d) and optionally primer (e) and sulfur (f) in mixtures and/or kneaders for use in this art.

The mixtures formed are elastic, halogen-free adhesives which show good low-temperature flexibility and favorable rheological properties. Their adhesion to steel and galvanized steel, even in the oiled state, is excellent. The stability of the adhesive mixtures of the invention in storage, even under extreme conditions, is distinctly superior to that of conventional adhesives.

By comparison with adhesives containing non-depolymerized solid rubber, adhesives containing depolymerized solid rubber show distinctly lower viscosity for a higher strength level. At the same time, the rheological properties are also excellent: There was no sign of long break-off or legging.

Where depolymerized natural rubber is used in the adhesives according to the invention, the results obtained are comparable with those obtained where depolymerized synthetic rubber is used, including good rheological behavior for low viscosity and a very high strength level.

The invention is illustrated but not limited by the following Examples.

The components listed in Table 1 below were used for the production of the low-viscosity rubber-based adhesives of the invention.

TABLE 1

Components used in the production of the adhesives of the invention

| Abbreviation | Name |
| --- | --- |
| LR | Liquid rubber based on cis-1,4-polybutadiene (MW 1500, as measured by vapor pressure osmosis) |
| R1 | Solid rubber based on cis-1,4-polybutadiene, not depolymerized |
| R2 | Depolymerized solid rubber based on cis-1,4-polybutadiene |
| R3 | Depolymerized natural rubber (liquid natural rubber) |
| H1 | Dibenzothiazyl disulfide (conventional hardener) |
| H2 | Two-stage hardener system<br>1st stage:<br>N—cyclohexyl-2-benzothiazyl sulfenamide and 2-mercaptobenzothiazole<br>2nd stage:<br>diorthotolyl guanidine |
| F1 | Zinc oxide (Zinkoxid aktiv, a product of Bayer AG) |
| F2 | Calcium oxide |
| F3 | Silica, pyrogenic (Cab-O-Sil) |
| F4 | Magnesium/aluminium silicate (kaolin bolus alba) |
| F5 | Carbon black |
| P | Primer, based on phenol-resol resin (7% free phenol) |

TABLE 1-continued

| Components used in the production of the adhesives of the invention | |
|---|---|
| Abbreviation | Name |
| S | Ground sulfur |

COMPARISON EXAMPLE

To produce a comparison adhesive, the solid rubber based on cis-1,4-polybutadiene listed as R1 in Table 1 was used as the solid rubber component. 3.0% by weight of the non-depolymerized solid rubber, based on the total quantity of all components, were incorporated in an intensively stirred mixture of the remaining components.

The properties of the adhesive obtained in this way are shown in Table 3 below.

It was found that the rheological properties of this adhesive were not satisfactory. The adhesive drew strings and the break-off was evaluated as too long. In addition, pregelability was only quaranteed beyond 160° C.

EXAMPLES 1 to 3

Adhesives according to the invention were produced with the components quantitatively listed in Table 2 below. This was done by depolymerizing the solid rubber at 140° C. to 150° C. in an internal floating-weight kneader in the presence of the zinc salt of pentachlorothiophenol as depolymerization accelerator and adding part of the filler F4 to enable the viscous mass to be emptied from the kneader (Examples 1 and 2). In those cases, the end product was produced by subsequent homogenization of all the components in a mixer.

Where a depolymerized natural rubber was used, "solid rubber" and liquid rubber (LR) (Example 3) were homogenized in a mixer. The remaining components were then mixed in and homogenized.

In every case, the adhesives were pregelable after 7 minutes at an object temperature of 120° C. to 160° C. The other properties are shown in Table 3 below.

TABLE 2

Formulations of Examples 1 to 3 and the Comparison Example

| Constituents | Component (% by weight) | | | |
|---|---|---|---|---|
| | Comp. Ex. | Ex. 1 | Ex. 2 | Ex. 3 |
| LR | 35.0 | 35.0 | 41.8 | 41.8 |
| R1 | 3.0 | — | — | — |
| R2 | — | 3.0 | 3.6 | — |
| R3 | — | — | — | 3.6 |
| S | 6.0 | 6.0 | 6.2 | 6.2 |
| H1 | 1.2 | 1.2 | — | — |
| H2 | — | — | 3.9 | 3.9 |
| F1 | 2.9 | 2.9 | 4.4 | 4.4 |
| F2 | 4.4 | 4.4 | 6.0 | 6.0 |
| F3 | 2.5 | 2.5 | 3.4 | 3.4 |
| F4 | 40.6 | 40.6 | 26.8 | 26.8 |
| F5 | 1.0 | 1.0 | 0.9 | 0.9 |
| P | 3.4 | 3.4 | 3.0 | 3.0 |
| Total | 100.0 | 100.0 | 100.0 | 100.0 |

TABLE 3

Properties of the adhesives

| | Technical data | | | |
|---|---|---|---|---|
| | Comp. Ex. | Ex. 1 | Ex. 2 | Ex. 3 |
| Viscosity | | | | |
| Extrusion time (secs.) of 20 g adhesive at 2.8 bar/2 mm nozzle, 20° C. | 190 | 140 | 100 | 80 |
| Stability | good | good | good | good |
| Break-off | too long | short | short | short |
| Tensile shear strength (N/mm$^2$) | | | | |
| 3 mm layer on oiled steel plate St1405, d = 0.8 mm according to DIN 53283 | 1.1 | 1.3 | 1.2 | 1.4 |
| Low temperature flexibility | very good | very good | very good | very good |
| Elasticity | good | good | good | good |
| Pregelling temperature (° C.) | 160 | 160 | 120 | 120 |

RESULTS

The formulations of Examples 1 and 2 (solid rubber, depolymerized in an internal floating-weight kneader and then dissolved in liquid rubber) show good rheological behavior for low viscosities.

The lowest viscosity is achieved in the formulation of Example 3 containing depolymerized natural rubber (liquid natural rubber) which was not dissolved in liquid rubber before incorporation in the adhesive mixture. The rheology of this adhesive is also very good. In addition, it shows the highest tensile shear strength of all the formulations.

Commensurate with the applications envisaged, the adhesives of Examples 1 to 3 are pregelable at temperatures above 120° C. and, after hardening cycles of up to 30 minutes at 160° to 220° C., show very good low-temperature flexibility and good elasticity.

I claim:

1. A rubber-based adhesive composition comprising:
   (a) from about 20 to about 60% by weight of liquid stereospecific polybutadiene rubber;
   (b) from about 1.5 to about 5% by weight of one or more chemically irreversibly depolymerized solid rubbers of natural or synthetic origin;
   (c) from about 0.5 to about 15% by weight of one or more hardeners;
   (d) from about 25 to about 70% by weight of one or more fillers;
   (e) from 0 to about 8% by weight of one or more primers; and
   (f) from 0 to about 12% by weight of sulfur.

2. The composition of claim 1 wherein component (e) is present in from about 1 to about 8% by weight.

3. The composition of claim 1 wherein component (f) is present in from about 2 to about 12% by weight.

4. The composition of claim 2 wherein component (f) is present in from about 2 to about 12% by weight.

5. The composition of claim 1 wherein component (a) has from about 40 to about 95% 1,4-configuration.

6. The composition of claim 5 wherein more than about 80% has the 1,4-configuration.

7. The composition of claim 5 wherein the molecular weight is in the range of from about 1000 to about 8000.

8. The composition of claim 1 wherein component (b) has a viscosity of from 2000 P to 20,000 P at 20° C.

9. The composition of claim 8 wherein component (b) is one or more chemically irreversibly depolymerized solid stereospecific cis-1,4-butadiene rubber.

10. The composition of claim 1 wherein component (b) is a chemically irreversibly depolymerized solid natural rubber.

11. The composition of claim 1 wherein component (c) is dibenzothiazyl disulfide.

12. The composition of claim 1 wherein component (c) is a two-stage hardener containing N-cyclohexyl-2-benzothiazyl sulfenamide and 2-mecaptobenzothiazole for the first stage and diorthotolyl quanidine for the second stage.

13. The composition of claim 1 wherein component (d) is at least one of zinc oxide, calcium oxide, silica, magnesium-aluminum silicates and carbon black.

14. The composition of claim 13 wherein component (d) contains from about 1 to about 4% by weight of zinc oxide, from about 3 to about 8% by weight of calcium oxide, from about 1 to about 5% by weight of silica, from 20 to about 50% by weight of magnesium-aluminum silicate, and from about 0.5 to about 2% by weight of carbon black, the percentages by weight being based on the total weight of the adhesive composition.

15. The composition of claim 1 wherein component (e) is present and is a phenol-cresol resin.

16. A process for the preparation of the rubber-based adhesives of claim 1 comprising the steps of
   A. chemically irreversibly depolymerizing one or more solid rubbers of natural or synthetic origin to a viscosity of from about 2000 P to about 20,000 P at 20° C.,
   B. optionally dissolving the resulting depolymerized rubber in component (a), and
   C. mixing the depolymerized rubber from step A or the solution thereof from step B with the remaining components to form a homogeneous rubber mixture.

17. A process of claim 16 wherein the solid rubber of step A prior to depolymerizing is a stereospecific cis-1,4-butadiene rubber.

18. The process of claim 16 wherein in step A the solid rubber before depolymerizing is a solid natural rubber.

19. The process of claim 16 wherein step A is carried out at a temperature of from about 120° C. to about 150° C.

20. The process of claim 16 wherein step A is carried out on friction rolls.

21. The process of claim 16 wherein step A is carried out in an internal floating-weight kneader.

22. The process of claim 21 wherein step A is carried out in the presence of a depolymerization accelerator.

23. The process of claim 22 wherein the depolymerization accelerator is the zinc salt of pentachlorothiophenol.

24. A method of bonding metal in motor vehicles comprising applying thereto the composition of claim 1.

25. The process of claim 24 wherein the bonding is for the purpose of filling gaps and/or sealing joints in the motor vehicles.

* * * * *

UNITED STATES PATENT AND TRADEMARK OFFICE
CERTIFICATE OF CORRECTION

PATENT NO.   : 4,824,512
DATED        : April 25, 1989
INVENTOR(S)  : Hans-Peter Kohlstadt It is certified that error appears in the above-identified patent and that said Letters Patent is hereby corrected as shown below:

At Col. 7, line 15, "4%" should read --5%--.

Signed and Sealed this

Third Day of July, 1990

Attest:

HARRY F. MANBECK, JR.

Attesting Officer

Commissioner of Patents and Trademarks